United States Patent
Kramek et al.

(10) Patent No.: US 9,993,021 B2
(45) Date of Patent: Jun. 12, 2018

(54) METHOD AND SYSTEM FOR ARRANGING ROD-LIKE ELEMENTS AND SYSTEM FOR RECOVERING TOBACCO FROM WASTE CIGARETTES

(71) Applicant: International Tobacco Machinery Poland Sp. z o.o., Radom (PL)

(72) Inventors: Tomasz Jan Kramek, Radom (PL); Robert Chmielewski, Wrzosów (PL)

(73) Assignee: INTERNATIONAL TOBACCO MACHINERY POLAND SP. Z O.O., Radom (PL)

( * ) Notice: Subject to any disclaimer, the term of this patent is extended or adjusted under 35 U.S.C. 154(b) by 918 days.

(21) Appl. No.: 14/381,299

(22) PCT Filed: Feb. 21, 2013

(86) PCT No.: PCT/PL2013/050007
§ 371 (c)(1),
(2) Date: Aug. 27, 2014

(87) PCT Pub. No.: WO2013/129952
PCT Pub. Date: Sep. 6, 2013

(65) Prior Publication Data
US 2015/0101621 A1    Apr. 16, 2015

(30) Foreign Application Priority Data
Feb. 28, 2012 (PL) .......................... 398256

(51) Int. Cl.
*A24C 5/36* (2006.01)
*B65G 47/24* (2006.01)
*B65G 37/00* (2006.01)

(52) U.S. Cl.
CPC ................ *A24C 5/36* (2013.01); *B65G 37/00* (2013.01); *B65G 47/24* (2013.01)

(58) Field of Classification Search
CPC .. A24C 5/36; A24C 5/00; B65G 47/24; B65G 37/00
(Continued)

(56) References Cited

U.S. PATENT DOCUMENTS

| | | |
|---|---|---|
| 3,665,931 A | 5/1972 | Mizzau |
| 5,000,196 A | 3/1991 | Stewart et al. |
| 5,076,291 A | 12/1991 | Grove et al. |

FOREIGN PATENT DOCUMENTS

| | | |
|---|---|---|
| DE | 1106227 B | 5/1961 |
| DE | 1532266 A1 | 1/1970 |

(Continued)

OTHER PUBLICATIONS

International Search Report: PCT/PL2013/05007, dated Jun. 21, 2013.
Poland Search Report: P-398256, dated May 7, 2012.

*Primary Examiner* — Anthony Calandra
(74) *Attorney, Agent, or Firm* — Browdy and Neimark, PLLC

(57) ABSTRACT

Method and system for arranging rod-like elements, in particular cigarettes, on a longitudinal aligning conveyor (11) along the direction of movement of the conveyor, comprising a container (5) for unordered rod-like elements (6), a feeding conveyor (1), a chute (8) and the aligning conveyor (11), wherein the rod-like elements (6) fed from the container (5) are transported by the feeding conveyor (1) to the chute (8), the rod-like elements (6) being arranged on the feeding conveyor (1) transversally to the direction of movement, the bottom of the chute (8) being downwardly slanted at an angle (a) to the horizontal, the intake end of the longitudinally grooved aligning conveyor (11) being located downstream the outlet end (8C) of the chute (8), the aligning conveyor (11) being upwardly slanted at an angle (β) to the horizontal and being adapted to convey the rod-like ele- (Continued)

ments (6) from the outlet end (8C) of the chute (8) upward the aligning conveyor (11) with a speed enabling passing the rod-like elements (6) from the chute (8) into the grooves (9) of the aligning conveyor (11) along these grooves. System for recovering tobacco from waste cigarettes comprising the system for arranging rod-like elements according to the invention.

19 Claims, 5 Drawing Sheets

(58) Field of Classification Search
USPC .......................................................... 131/96
See application file for complete search history.

(56) References Cited

FOREIGN PATENT DOCUMENTS

| DE | 2032706 A1 | 1/1972 |
| EP | 2364605 A2 | 9/2011 |

METHOD AND SYSTEM FOR ARRANGING ROD-LIKE ELEMENTS AND SYSTEM FOR RECOVERING TOBACCO FROM WASTE CIGARETTES

The present invention relates to a method and system for arranging rod-like elements. The rod-like elements may in particular constitute substandard or defective cigarettes.

The invention relates further to a system for recovering tobacco from waste cigarettes.

Arranging the waste cigarettes may be a useful operation preceding opening them in order to recover tobacco from them.

Various devices for arranging rod-like elements are known in the art.

Document U.S. Pat. No. 5,000,196 discloses e.g. a method and a device for recovering tobacco in which the cigarettes which have been rejected from a cigarette machine undergo a process of arranging. The cigarettes are thrown into a rotatable vibrating feeder which they leave in an arranged state through a channel and then proceed onto a transporter, to be cut on a cylinder provided with a cutting edge. Upon being cut open the cigarettes are transferred to a linear vibrating feeder where loose tobacco falls down through a dedicated outlet while their wrapping papers are collected through another opening.

In a device according to U.S. Pat. No. 3,665,931 the cigarettes are taken over from a feeder by a conveyor having collecting slats from where the cigarettes fall onto a grooved sliding tray. On this tray the cigarettes are arranged along the grooves having rims on various heights and transported on with their axes parallel to each other.

U.S. Pat. No. 5,076,291 discloses a device in which the cigarettes are thrown into a rotatable vibrating feeder from where they are transferred one by one through a chute onto a drum and further on by a belt conveyor and onto another drum where the arrangement of the cigarettes in grooves is detected, the cigarettes are shifted and the filters are cut away. The device according to U.S. Pat. No. 5,076,291 enables cutting open single defective cigarettes that are not arranged in any orderly manner, i.e. having their filter parts oriented in both possible directions.

Document U.S. Pat. No. 3,404,688 discloses a device for cutting open the elements of cigarettes rejected from the production process, the elements being the so called "double cigarettes" consisting of a double filter part and two tobacco parts. The cigarettes are transported on a drum and cut open by disc knives. DE 1106227 presents a device for cutting cigarette tobacco parts off their filter parts, the device requiring an orderly arrangement of the cigarettes with their filters oriented in one direction depending on the position of a disc knife used for cutting the cigarette parts.

The above listed documents describe low efficient devices for arranging cigarettes and recovering tobacco. The devices using vibrating feeders are the least efficient. The device presented in U.S. Pat. No. 3,665,931, while having a relatively high efficiency, does not however guarantee that the cigarettes are arranged 100% longitudinally.

The aim of the present invention is to provide an improved method and system for arranging waste elements that are produced at various stages of the cigarette production process and that are unordered, in such a way that all the elements become oriented substantially in parallel to each other and in one direction.

Another aim of the present invention is to provide a system for recovering tobacco from waste cigarettes.

The inventors of the present invention have unexpectedly discovered that the elements transported by a combination of specially selected feeders and conveyors, each moving with a suitably adjusted speed, will "automatically" fall into the grooves of an aligning conveyor and become oriented in parallel to the direction of movement along this conveyor.

The system according to a first aspect of the invention, for arranging rod-like elements, in particular cigarettes, on a longitudinal aligning conveyor along the direction of movement of the conveyor, comprises a container for unordered rod-like elements, a feeding conveyor, a chute and the aligning conveyor and is characterized in that the rod-like elements fed from the container are transported by the feeding conveyor to the chute, the rod-like elements being arranged on the feeding conveyor transversally to the direction of movement, the bottom of the chute being downwardly slanted at an angle $\alpha$ to the horizontal, the intake end of the longitudinally grooved aligning conveyor being located downstream the outlet end of the chute, the aligning conveyor being upwardly slanted at an angle $\beta$ to the horizontal and being adapted to convey the rod-like elements from the outlet end of the chute upward the aligning conveyor with a speed enabling passing the rod-like elements from the chute into the grooves of the aligning conveyor along these grooves.

Preferably, the feeding conveyor is a belt conveyor equipped with transversal collecting slats fitted on the external surface of the belt.

The direction of movement of the rod-like elements within the chute, as seen from above, is preferably substantially parallel to the orientation of the rod-like elements on the feeding conveyor.

An intermediate chute member may be provided between the chute and the aligning conveyor, the direction of movement, as seen from above, of the rod-like elements at the outlet of the intermediate chute member, being substantially parallel to the orientation of the rod-like elements on the aligning conveyor.

Preferably, the bottom of the chute is positioned at an angle $\gamma$ in the range of 60° and 150°, preferably from 75° to 110°, most preferably from 85° to 95°, to the direction of the slant of the aligning conveyor.

Also preferably the bottom of the chute is positioned at an angle $\alpha$ in the range of 15° and 60°, preferably from 30° to 50°, most preferably from 45° to 50°, to the horizontal.

In a preferred embodiment, the aligning conveyor is a belt conveyor, the upper surface of the belt being formed as a multi-groove surface; optionally the aligning conveyor may be composed of a plurality of belts the operating surfaces of which being shaped as an inverted "V".

Preferably, the aligning conveyor is positioned at an angle $\beta$ in the range of 15° and 60°, preferably from 30° to 50°, most preferably from 40° to 45°, to the horizontal.

Also preferably the belt of the aligning conveyor is movable at a speed in the range of 0.1 m/s and 1 m/s, preferably from 0.3 m/s to 0.8 m/s, most preferably at 0.7 m/s.

The speed of movement of the belt of aligning conveyor may be adjusted depending on its slant angle $\beta$.

The system according to a second aspect of the invention, for recovering tobacco from waste cigarettes by separating their filter parts from their tobacco parts, comprises an assembly for longitudinal cutting of the paper wrappers of the tobacco parts and an assembly for removing tobacco out of them, and is characterized in that upstream the assembly for longitudinal cutting of the wrappers it comprises the system for arranging rod-like elements according to the first aspect of the invention, downstream of which an intermediate hopper is located for receiving the cigarettes delivered by the said system for arranging rod-like elements, a transport cylinder having a grooved circumferential surface being provided under the hopper for transferring the cigarettes, the system being further provided with operating-control means for shifting the cigarettes within the grooves of the transport cylinder surface so as to locate the borders of the cigarette filter parts along mutual circumferential lines around the cylinder, the system being further provided with means for separating the tobacco parts from the filter parts of the cigarettes located in the grooves of the transport cylinder.

Preferably, the operating-control means comprise a scanning head for scanning the side surfaces and/or at least one end surface of each consecutive cigarette on the transport cylinder surface as well as pressurized air nozzles shifting the cigarettes along the grooves.

The means for separating the tobacco parts of the cigarettes are preferably formed by disc knives located by the transport cylinder for cutting the tobacco parts off the filter parts.

Preferably, in the upper zone of the aligning conveyor, between the intermediate hopper and the transport cylinder, an aligning assembly is provided, the aligning assembly comprising the rods that are reciprocally moveable in a direction transversal to the grooves.

Preferably, the system comprises means for feeding the separated tobacco parts to the assembly by means of pressurized air.

The method according to a third aspect of the invention, of arranging rod-like elements, in particular cigarettes, on a longitudinal aligning conveyor parallel to the direction of movement along the conveyor, comprises feeding unordered rod-like elements onto a feeding conveyor on which the rod-like elements are placed transversely to said direction of movement, then transferring the rod-like elements downwards, parallel to the direction of their axes when fed along the conveyor, from the feeding conveyor through a chute, the bottom of the chute being downwardly slanted at an angle α to the horizontal, onto a longitudinally grooved aligning conveyor, on which the rod-like elements are transported upwards, the direction of transport being parallel to their axes and slanted at an angle β to the horizontal, the speed of feeding the rod-like elements onto the aligning conveyor being adjusted so as to enable the rod-like elements coming from the chute to enter into the grooves of the aligning conveyor oriented along these grooves.

Preferably, the speed of feeding the rod-like elements onto the aligning conveyor is adjusted depending on the speed of movement of the belt of the conveyor and/or its angle of slant β.

The invention advantageously provides the system and the method enabling fast and effective arrangement of an unordered portion of waste rod-like elements so that all the elements become arranged along one direction. On the other hand, the improved system for recovering tobacco from substandard cigarettes is provided, making use of the system for arranging the rod-like elements according to the invention.

An exemplary embodiment of the subject of the invention is illustrated in the drawing, in which.

Figure 3:
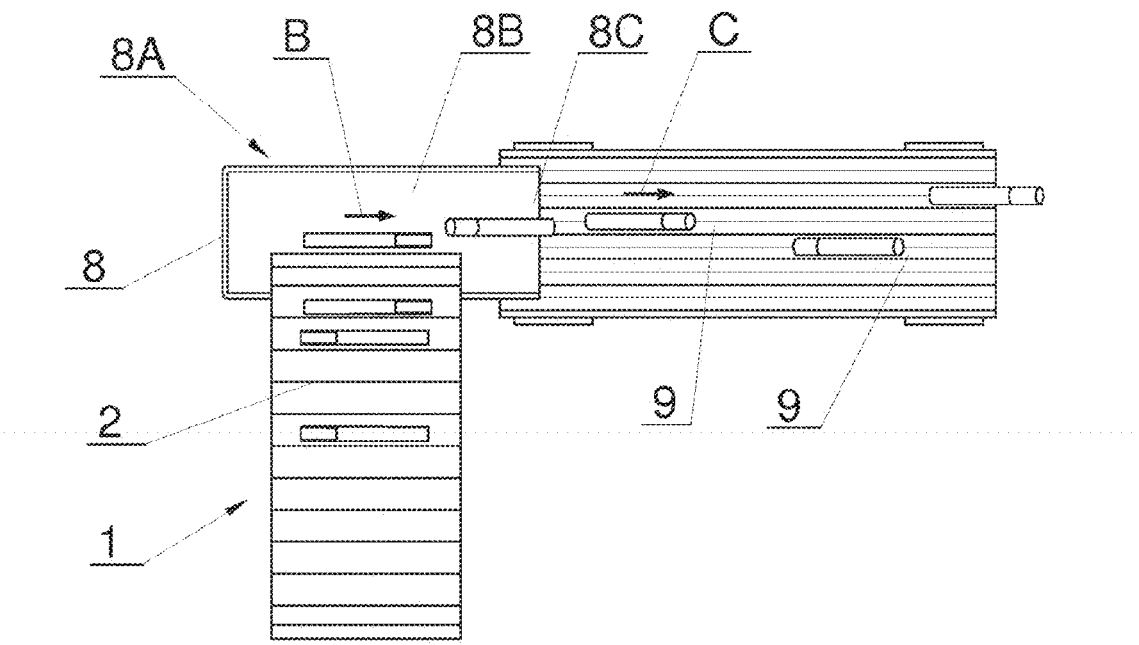
FIG. 3 shows a schematic top view of the system for arranging the rod-like elements according to the invention.
Figure 4:
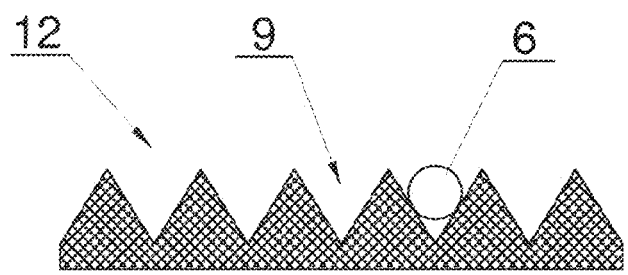
Figure 5:
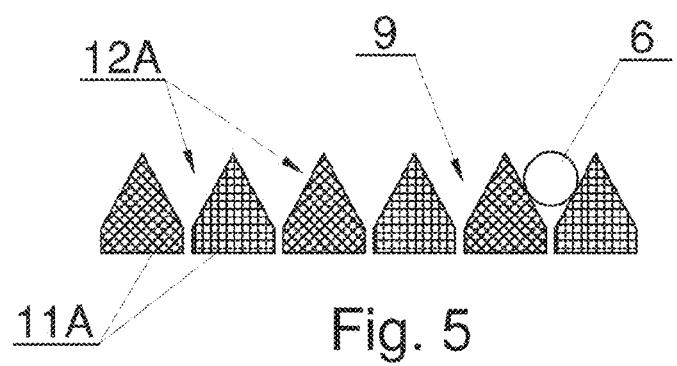
Figure 6:
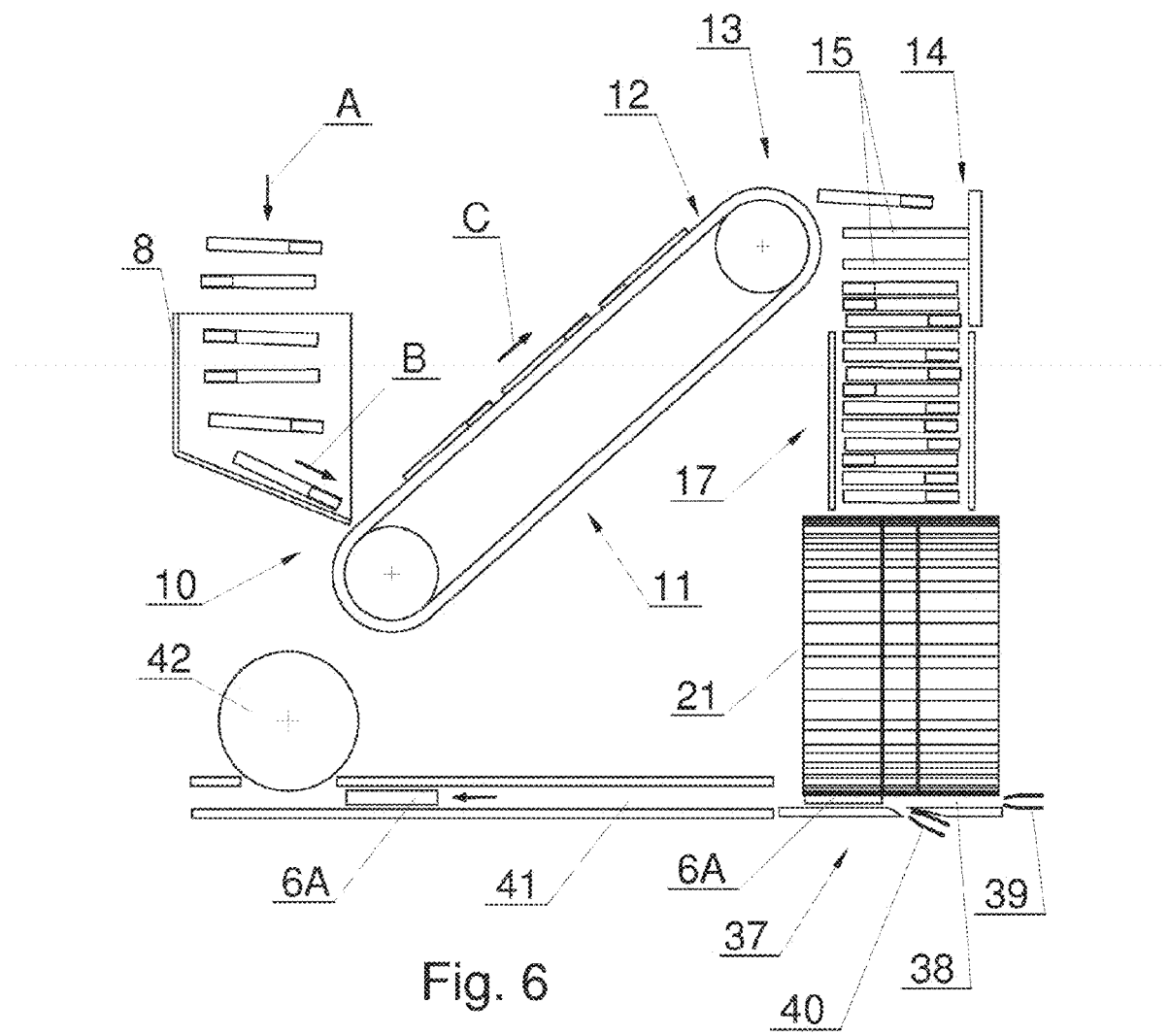
Figure 7:
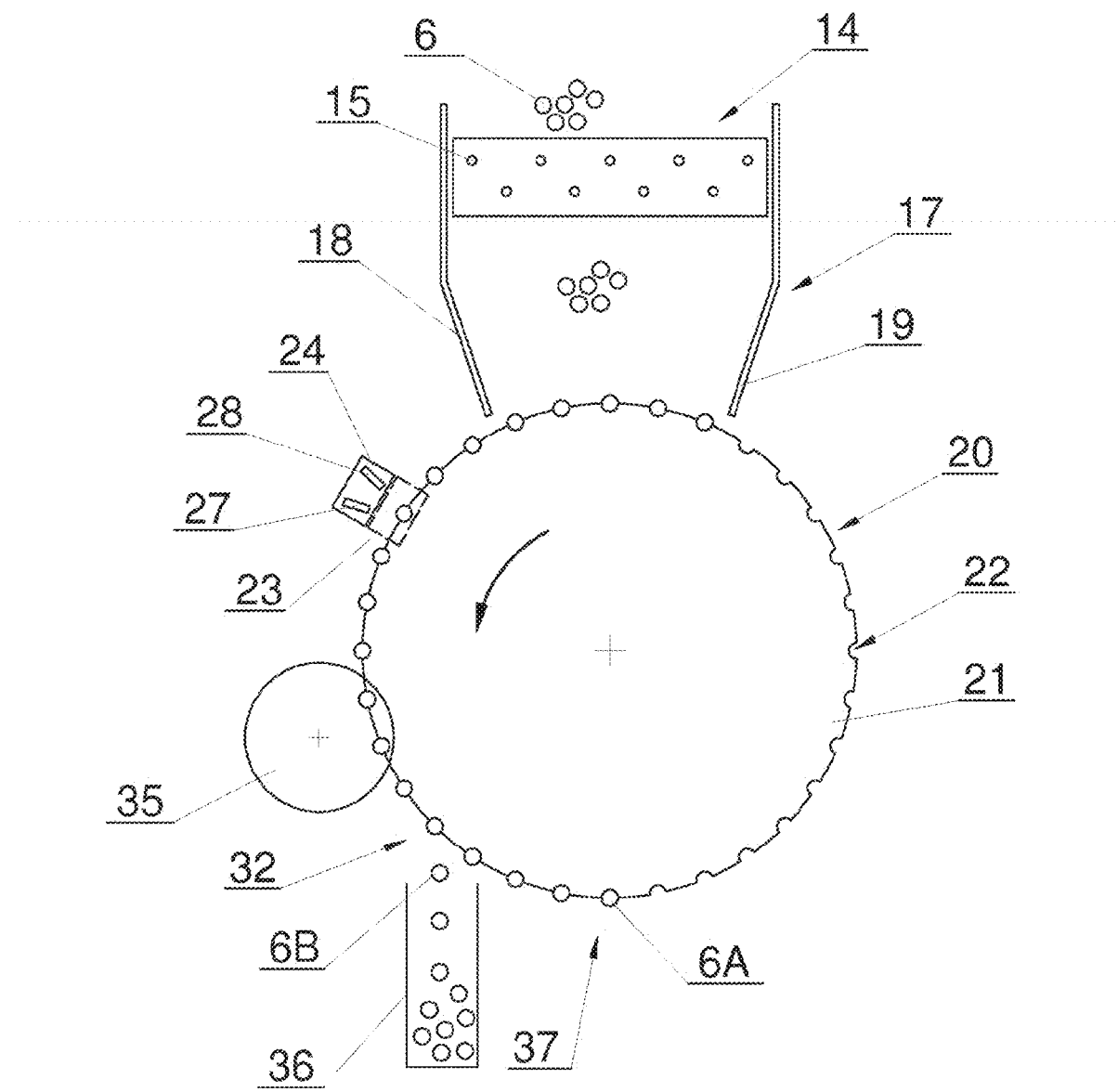
Figure 8:
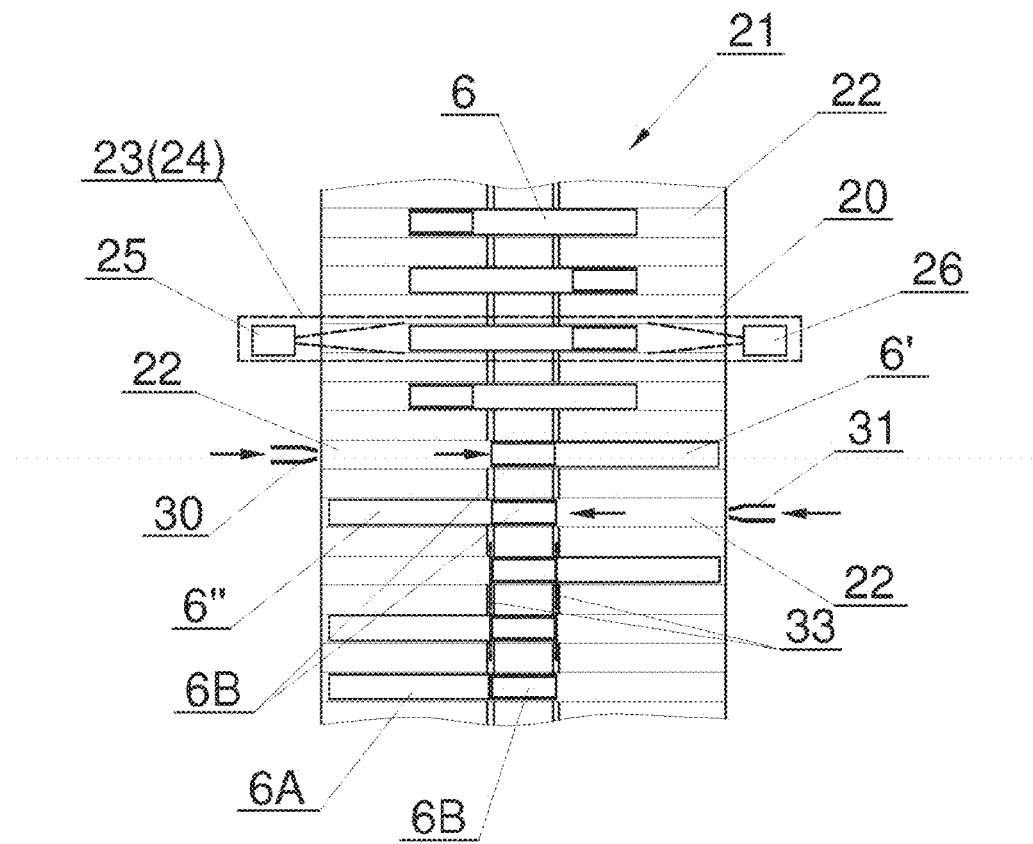

FIG. 3' shows another version of the system shown in FIG. 3 provided with an intermediate member;

FIG. 4 shows a cross-section of an aligning conveyor belt;

FIG. 5 shows a cross-section of another embodiment of an aligning conveyor belt;

FIG. 6 shows a schematic side view of the system for recovering tobacco according to the invention;

FIG. 7 shows a schematic view of the part of the system for recovering tobacco in which a transport cylinder is located;

FIG. 8 shows a schematic view of a developed circumferential surface of the transport cylinder.

FIGS. 1 to 5 schematically show the system according to the invention for arranging the rod-like elements on a longitudinal aligning conveyor parallel to the direction of movement along the conveyor, the elements being in particular cigarettes.

Figure 1:
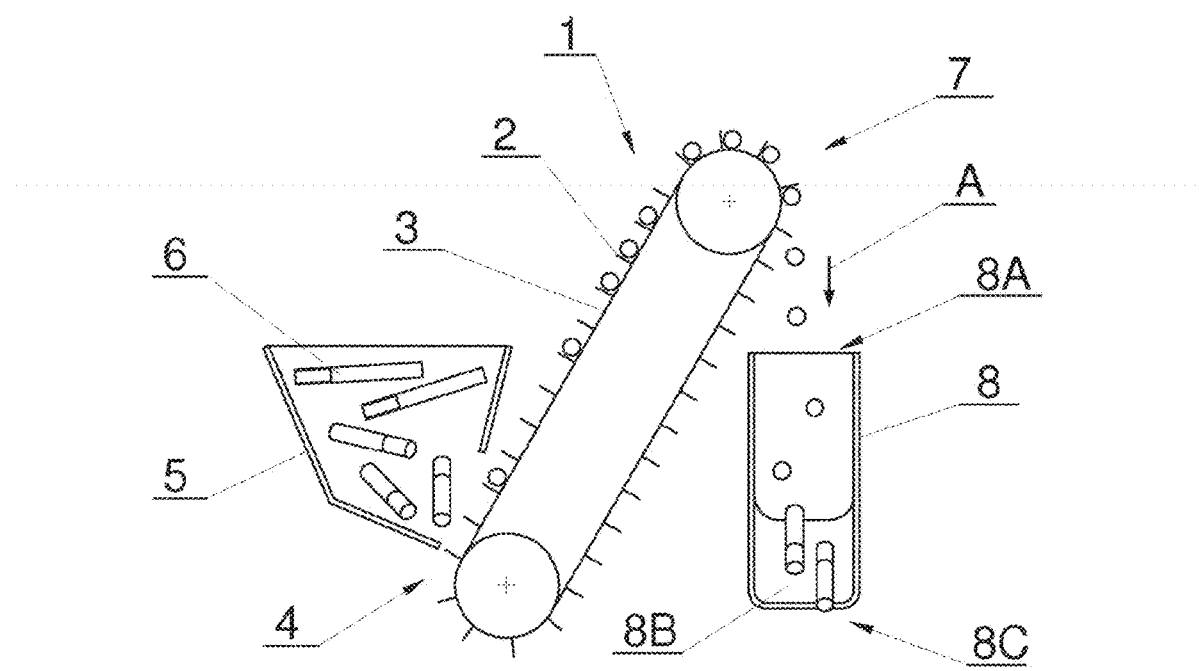
FIG. 1 shows a schematic side view of a first part of the system for arranging the rod-like elements according to the invention.

The system is equipped with a first feeding conveyor 1 shown in FIG. 1. The feeding conveyor 1 is a belt conveyor provided with transversal collecting slats 2 fitted on the external surface of the belt 3. Unordered cigarettes are located in a container 5 having an outlet located above the lower zone 4 of the feeding conveyor 1.

Figure 2:
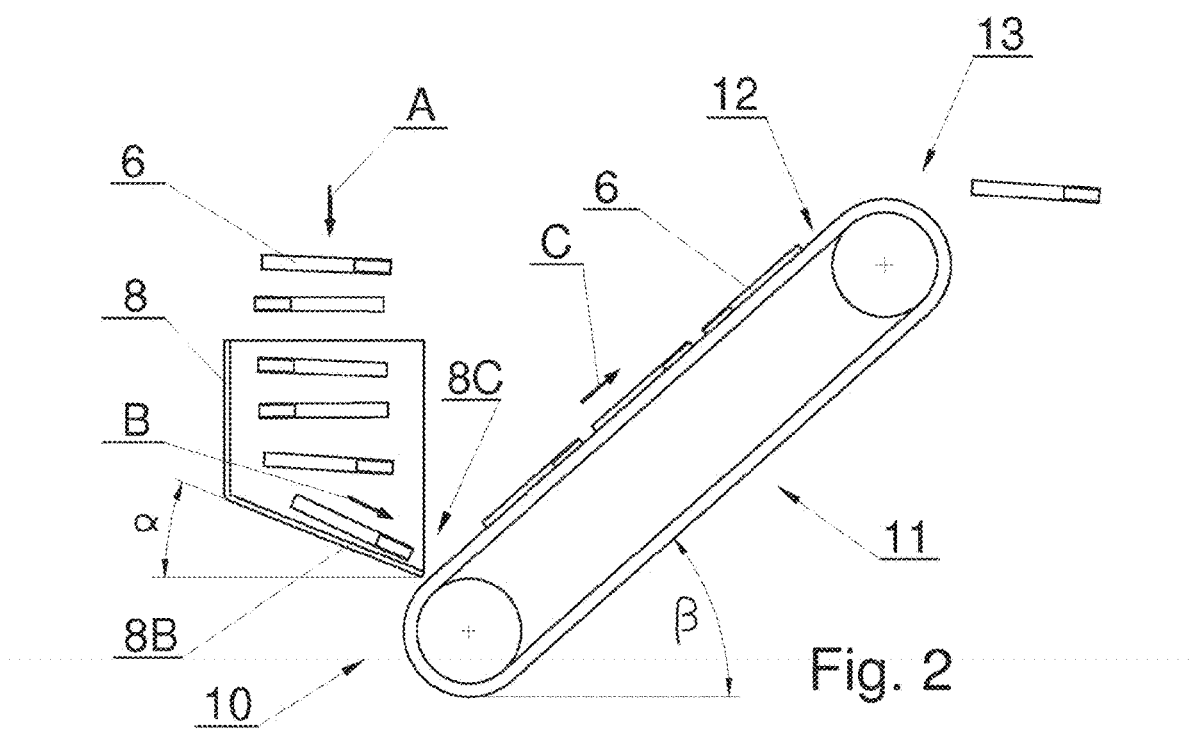
FIG. 2 shows a schematic side view of a second part of the system for arranging the rod-like elements according to the invention.

In the upper zone 7 of the feeding conveyor 1 the cigarettes fall down by gravity (in a direction shown by an arrow A). A chute 8 is located below said upper zone 7 for receiving the falling cigarettes 6 (FIGS. 1 and 2). As seen from above (FIG. 3), the inlet 8A of the chute 8 is oriented substantially in parallel to the collecting slats 2 of the feeding conveyor 1. The bottom of the chute 8 is downwardly slanted in relation to the horizontal (FIG. 2).

As seen from above (FIG. 3), the direction, shown by an arrow B, of movement of the cigarettes 6 on the chute bottom 8B is substantially parallel to the orientation of the cigarettes on the feeding conveyor 1, between the collecting slats 2. The chute 8 may have a flat bottom 8B with the edges rounded near the side walls or it may have a rounded bottom. The direction B of feeding the cigarettes, i.e. substantially the direction adopted by the cigarettes within the chute 8, is parallel to the dashed-dotted line 8D shown in FIG. 3.

The bottom 8B of the chute 8 is preferably positioned at an angle α in the range of 15° and 60°, more preferably from 30° to 50°, and most preferably at 45° to the horizontal. The outlet of the chute 8 is located in the lower zone 10 of a longitudinal aligning conveyor 11. The aligning conveyor 11 is a belt conveyor having the upper surface formed as a multi-groove surface (FIG. 4) or is composed of a plurality of grooves 9. In a variant the aligning conveyor 11 may be composed of a plurality of belts 11A the operating surfaces of which are shaped as an inverted "V" forming the grooves.

The aligning conveyor 11 is positioned so that the grooves 9 are directed in parallel to the line 8D as seen from above, which is advantageous when the cigarettes are delivered directly onto the operating surface of the belt 12. However, as shown in FIG. 3', an intermediate member 8', e.g. a curved member may also be used in order to obtain a different configuration of the system. As seen in FIG. 3', the curved intermediate member 8' may be constituted by an additional slanted chute changing the direction of movement of the cigarettes.

The outlet 8C' of the curved element 8' may be located above the operating surface 12 of the conveyor 11. The outlet 8C' may be shaped as rectilinear so that the cigarettes 6 are directed along the line 8D' at the outlet 8C' and further onto the conveyor 11.

If for some reasons e.g. due to construction requirements, a different configuration of the system is required, a rectilinear intermediate chute may also be used. The chute 8 may also have a more complicated shape, e.g. it may be slightly twisted so that its outlet as seen from above is rotated in relation to its inlet.

The aligning conveyor 11 may be positioned at an angle β in the range of 15° and 60°, more preferably from 30° to 50°, and most preferably at 40° to the horizontal. The belt of the conveyor moves at a speed in the range of 0.1 m/s and 1 m/s, preferably from 0.3 m/s to 0.8 m/s, most preferably at 0.7 m/s, higher speeds being recommended for bigger angles β.

FIG. 6 shows a system for recovering tobacco from waste cigarettes. A part of this system has been described above with reference to FIGS. 1-5 showing the system for arranging the rod-like elements according to the invention.

As shown in FIG. 6, in the system for recovering tobacco according to the invention, the cigarettes coming from the upper zone 13 of the aligning conveyor 11 are thrown into an assembly 14 for aligning the parallel orientation of the transported cigarettes 6. The aligning assembly 14 comprises rods 15 that are reciprocally moveable in a direction that is perpendicular to the plane of the figure. An intermediate hopper 17 is located under the aligning assembly 14. The hopper 17 is laterally limited by walls 18 and 19, its bottom side being limited by the circumferential surface 20 of a transport cylinder 21.

The transport cylinder 21 has on its circumferential surface 20 a plurality of grooves 22 for transporting the cigarettes 6. The cigarettes 6 may be maintained within the grooves 22 by means of negative pressure distributed through the openings formed in the bottom of the grooves. Additionally, the cigarettes 6, while being transported on the cylinder 21, may be maintained within the grooves 22 by known curved guides (not shown in the figure), the inner surfaces of which having the radius of curvature slightly bigger than the radius of curvature of the circumferential surface 20 of the transport cylinder 21.

While being transported, each successive cigarette passes through an area of operation of operating-control means. This area comprises a first zone 23 of operation of a scanning head 24. The function of the scanning head 24 is to check the position of each successive cigarette by detecting in which direction the tobacco part 6A or the filter part 6B of a cigarette is facing. The scanning head 24 may comprise sensors 25, 26 aiming on the end surfaces of the cigarettes 6 or else other sensors 27, 28 aiming on their cylindrical side surfaces.

Close to the transport cylinder 21 and within a second zone of the area of operation of operating-control means pressurized air nozzles 30, 31 are provided for shifting the cigarettes 6 along the grooves 22 so as to locate the borders of the cigarette filter parts along mutual circumferential lines around the cylinder 21. The scanning head 24 with the sensors 24 and 25, as well as the pressurized air nozzles 30, 31 are shown in FIG. 8 presenting a developed view of the circumferential surface of the transport cylinder 21.

Near the transport cylinder 21, means for separating the tobacco parts of the cigarettes from their filter parts are provided. In this embodiment the separating means are formed by two disc knives 35 for cutting the tobacco parts 6A off the filter parts 6B. In FIG. 8, the borders of the filter parts of the cigarettes 6 are shown by dashed lines 33 in a situation when the cigarettes 6 have been shifted along the grooves 22 of the transport cylinder 21, the lines 33 running along the circumference of the cylinder 21. Moreover, the lines 33 indicate the position of the disc knives 35.

In a zone 32 (FIG. 7) the filter parts 6B are dropped from the transport cylinder 21 into a container 36, the dropping being caused by the pressurized air delivered through the openings in the bottoms of the grooves 22 or by a mechanical scraper. The tobacco parts 6A remaining on the transport cylinder 21 are transported to a dropping zone 37 where they are dropped away from the grooves 22 by the pressurized air. A dropping channel 38 is located under the transport cylinder 21 in the dropping zone 37. Two pressurized air nozzles 39 and 40 are located near the dropping channel 38, their function being to throw the tobacco parts 6A away from the dropping channel 38 and to introduce them into an outlet channel 41.

The nozzle 39 is positioned co-axially with the channel 38, while the nozzle 40 is positioned askew to the channel 38 and contributes to the throwing away of the parts 6A located further away from the nozzle 39. A cutting assembly is provided above the outlet channel 41. In this embodiment the cutting assembly is formed by a disc knife 42 for cutting the paper wrappers of the transported tobacco parts 6A.

Operation of the system for arranging rod-like elements and of the system for recovering tobacco from waste cigarettes, a part of which is constituted by the system arranging rod-like elements, will be described below. Unordered waste cigarettes 6 are thrown into the container 5. From the container 5 the cigarettes are taken away by the successive collecting slats 2 of the feeding conveyor 1 in its lower zone and transported upwards this conveyor 1. In its upper zone 7, the cigarettes fall into the chute 8 through its inlet 8A down to its bottom 8B. As the bottom 8B is slanted, the cigarettes 6 turn over upon bumping on it and slide down along, then leave the chute through the outlet 8C and contact by their leading ends the grooved operating surface 12 of the aligning conveyor 11 in the lower zone 10 thereof. The most specific feature of the system for arranging rod-like elements and hence the system for recovering tobacco from waste cigarettes according to the invention is the combination of the special juxtaposition of the outlet of the chute 8 with the beginning of the aligning conveyor 11 and the selection of suitable angles of slant of these elements to the horizontal as well as of the speed of movement of the aligning conveyor belt. Due to the designed specific combination of the angles of slant of the chute 8 and of the aligning conveyor 11, the cigarettes, in course of passing from the chute 8 onto the aligning conveyor 11, change their direction of movement by turning at an angle γ in the range of 60° and 150°.

The cigarettes are effectively located within the grooves 9 of the aligning conveyor 11 when the angle γ is in the range of 75° and 110°, however the most effective arrangement of the chute 8 and the aligning conveyor 11 is such that the cigarettes are turned at the angle γ in the range of 85° and 95°, i.e. substantially a right angle. Due to the above described specific arrangement of the elements of the system and their operation parameters, the cigarette endings are drawn upwards upon contact with the operating surface 12 and consequently the cigarettes do not swerve from the grooves 9 but follow upwards along the grooves directly from the outlet of the chute 8 or of the intermediate member constituting an extension of the chute. The result of the operation of the system for arranging the rod-like elements is the conversion of an unordered bulk of the rod-like elements into an orderly arranged sequence of separated elements transported in the grooves 22 of the aligning conveyor 11, in parallel to each other and to their direction of transport.

In the upper zone 13 of the aligning conveyor 11 the cigarettes are thrown away and consequently fall on the uppermost layer of the cigarettes collected in an intermediate hopper 17, advantageously over the aligning assembly 14 located above the intermediate hopper 17. The aligning assembly 14 with the rods 15 reciprocates horizontally in order to prevent any askew orientation of the cigarettes 6 lying on top. Upon leaving the intermediate hopper 17 the cigarettes are introduced into the grooves 22 of the transport drum 21 to be transported on its circumferential surface.

The cigarettes 6 are transferred through the operating zone 23 of the scanning head 24. The information about the orientation of each cigarette 6 is used by the operating-control means for switching on the means formed by a suitable pressurized air nozzle 30 or 31 (FIG. 8).

The nozzles 30 and 31 shift the cigarettes 6 so as to locate their filter parts 6B in the central part of the circumferential surface 20 of the transport cylinder with the borders of the filter parts along the dashed lines 33. In FIG. 8, the nozzle 30 shifts the cigarette 6' to the right and the nozzle 31 shifts the cigarette 6" to the left.

The cigarettes 6 arranged in such a way are transferred through the area of operation of the disc knives 35 cutting the cigarettes along the lines 33 in FIG. 8, the knives separating the tobacco parts 6A from the filter parts 6B. The cut cigarettes are transported on by the transport cylinder 21, the filter parts 6B being dropped from the cylinder 21 into the container 36 in a known manner, e.g. by means of pressurized air or mechanically. The tobacco parts 6A remain on the drum 21 and they are transported to the dropping zone 37. In this zone the tobacco parts 6A are thrown away through the dropping channel 38 by means of the nozzles 39 and/or 40. Each tobacco part 6A is introduced into the outlet channel 41 along which it proceeds while its paper wrapper is cut longitudinally by the cutting assembly, in particular the disc knife 42.

The invention claimed is:

1. A system for arranging rod-like elements, on a longitudinal aligning conveyor along the direction of movement of the conveyor, comprising:
    a container for unordered rod-like elements,
    a feeding conveyor,
    a chute, and
    the longitudinal aligning conveyor comprising a plurality of grooves,
    wherein the rod-like elements fed from the container are transported by the feeding conveyor to the chute, the rod-like elements being arranged on the feeding conveyor transversally to the direction of movement, the bottom of the chute being downwardly slanted at a first angle to the horizontal, an intake end of the longitudinally aligning conveyor being located downstream an outlet end of the chute, the longitudinal aligning conveyor being upwardly slanted at a second angle to the horizontal and being configured to convey the rod-like elements from the outlet end of the chute upward the longitudinal aligning conveyor with a speed enabling passing the rod-like elements from the chute into the plurality of grooves of the longitudinal aligning conveyor oriented along the plurality of grooves.

2. The system according to claim 1, wherein the feeding conveyor is a belt conveyor equipped with transversal collecting slats fitted on an external surface of the belt conveyor.

3. The system according to claim 1, wherein the chute is oriented with respect to the feeding conveyor such that a direction of movement of the rod-like elements within the chute, as seen from above, is substantially parallel to the longitudinal orientation of the rod-like elements on the feeding conveyor.

4. The system according to claim 1, further comprising an intermediate chute member provided between the chute and the longitudinal aligning conveyor, a direction of movement, as seen from above, of the rod-like elements at the outlet of the intermediate chute member, is substantially parallel to the orientation of the rod-like elements on the longitudinal aligning conveyor.

5. The system according to claim 1, wherein the bottom of the chute is positioned at a third angle in the range of from 75° to 110° with respect to a direction of the slant of the longitudinal aligning conveyor.

6. The system according to claim 1, wherein the bottom of the chute is positioned at the first angle in the range of from 30° to 50° to the horizontal.

7. The system according to claim 1, wherein the longitudinal aligning conveyor is a belt conveyor, an upper surface of the belt conveyor comprising the plurality of grooves or the longitudinal aligning conveyor is composed of a plurality of belts having operating surfaces shaped as an inverted "V" forming the plurality of grooves.

8. The system according to claim 1, wherein the longitudinal aligning conveyor is positioned at the second angle in the range of from 30° to 50° to the horizontal.

9. The system according to claim 1, wherein the longitudinal aligning conveyor is movable at a speed in the range of 0.1 m/s and 1 m/s, preferably from 0.3 m/s to 0.8 m/s.

10. The system according to claim 1, wherein the longitudinal aligning conveyor is configured to have a speed of movement that depends on the slant of the second angle.

11. A system for recovering tobacco from waste cigarettes by separating filter parts of the waste cigarettes from tobacco parts of the waste cigarettes, the system for recovering tobacco comprising:
    the system for arranging rod-like elements according to claim 1, and
    downstream of the system for arranging rod-like elements:
        an intermediate hopper for receiving the waste cigarettes delivered by the system for arranging rod-like elements,
        a transport cylinder having a circumferential surface being provided under the hopper for transferring the cigarettes, the circumferential surface comprising grooves,
        operating-control means comprising pressurized air nozzles to shift the waste cigarettes within the grooves of the transport cylinder circumferential surface so as to locate borders of the filter parts along mutual circumferential lines around the transport cylinder,
        a unit to separate the tobacco parts from the filter parts of the waste cigarettes located in the grooves of the transport cylinder,
    an assembly for longitudinal cutting of paper wrappers of the tobacco parts disposed downstream of the unit to separate, and
    an assembly for removing tobacco out of the paper wrappers downstream of the assembly for longitudinal cutting.

12. The system according to claim 11, wherein the operating-control means further comprises a scanning head for scanning side surfaces and/or at least one end surface of each waste cigarette on the transport cylinder circumferential surface.

13. The system according to claim 11, wherein the unit to separate the tobacco parts of the waste cigarettes comprises disc knives located by the transport cylinder for cutting the tobacco parts off the filter parts.

14. The system according to claim 11, further comprising an aligning assembly provided in an upper zone of the longitudinal aligning conveyor, between the intermediate hopper and the transport cylinder, the aligning assembly comprising rods that are reciprocally moveable in a direction transverse to the grooves of the transport cylinder.

15. The system according to claim 11, further comprising a unit to feed separated tobacco parts to the assembly by pressurized air.

16. A method of arranging rod-like elements on a longitudinal aligning conveyor parallel to a direction of movement along the conveyor, comprising:
feeding unordered rod-like elements onto a feeding conveyor on which the rod-like elements are placed transversely to said direction of movement, then transferring the rod-like elements downwards, parallel to a direction of axes of the rod-like elements when fed along the feeding conveyor, from the feeding conveyor through a chute, a bottom of the chute being downwardly slanted at a first angle to the horizontal, onto an aligning conveyor having a plurality of grooves oriented in a longitudinal direction on the aligning conveyor, on which the rod-like elements are transported upwards, a direction of transport of the rod-like elements being parallel to the axes and slanted at a second angle to the horizontal, a speed of feeding the rod-like elements onto the aligning conveyor being adjusted so as to enable the rod-like elements coming from the chute to enter into the grooves of the aligning conveyor oriented along the plurality of grooves.

17. The method according to claim 16, wherein the speed of feeding the rod-like elements onto the aligning conveyor is adjusted depending on the speed of movement of the aligning conveyor and/or an angle of slant of the aligning conveyor.

18. A system for arranging rod-like elements, on a longitudinal aligning conveyor along the direction of movement of the conveyor, comprising:
a container for unordered rod-like elements,
a feeding conveyor,
a chute,
the longitudinal aligning conveyor, and
an intermediate chute member is provided between the chute and the longitudinal aligning conveyor, a direction of movement, as seen from above, of the rod-like elements at the outlet of the intermediate chute member, is substantially parallel to the orientation of the rod-like elements on the longitudinal aligning conveyor,
wherein the rod-like elements fed from the container are transported by the feeding conveyor to the chute, the rod-like elements being arranged on the feeding conveyor transversally to the direction of movement, the bottom of the chute being downwardly slanted at a first angle to the horizontal, an intake end of the longitudinally aligning conveyor being located downstream an outlet end of the chute, the longitudinal aligning conveyor being upwardly slanted at a second angle to the horizontal and being configured to convey the rod-like elements from the outlet end of the chute upward the longitudinal aligning conveyor with a speed enabling passing the rod-like elements from the chute into grooves in the longitudinal aligning conveyor.

19. A system for recovering tobacco from waste cigarettes by separating filter parts of the waste cigarettes from tobacco parts of the waste cigarettes, the system comprising an assembly for longitudinal cutting of paper wrappers of the tobacco parts and an assembly for removing tobacco out of the paper wrappers, comprising:
upstream from the assembly for longitudinal cutting of the paper wrappers, a system for arranging rod-like elements on a longitudinal aligning conveyor along the direction of movement of the conveyor, comprising:
a container for unordered rod-like elements,
a feeding conveyor,
a chute,
the longitudinal aligning conveyor, and
an intermediate chute member is provided between the chute and the longitudinal aligning conveyor, a direction of movement, as seen from above, of the rod-like elements at the outlet of the intermediate chute member, is substantially parallel to the orientation of the rod-like elements on the longitudinal aligning conveyor,
wherein the rod-like elements fed from the container are transported by the feeding conveyor to the chute, the rod-like elements being arranged on the feeding conveyor transversally to the direction of movement, the bottom of the chute being downwardly slanted at a first angle to the horizontal, an intake end of the longitudinally aligning conveyor being located downstream an outlet end of the chute, the longitudinal aligning conveyor being upwardly slanted at a second angle to the horizontal and being configured to convey the rod-like elements from the outlet end of the chute upward the longitudinal aligning conveyor with a speed enabling passing the rod-like elements from the chute into grooves in the longitudinal aligning conveyor,
downstream of the system for arranging rod-like elements:
an intermediate hopper for receiving the waste cigarettes delivered by the system for arranging rod-like elements,
a transport cylinder having a circumferential surface being provided under the hopper for transferring the cigarettes, the circumferential surface comprising grooves,
operating-control means comprising pressurized air nozzles to shift the waste cigarettes within the grooves of the transport cylinder circumferential surface so as to locate borders of the filter parts along mutual circumferential lines around the transport cylinder,
a unit to separate the tobacco parts from the filter parts of the waste cigarettes located in the grooves of the transport cylinder.

* * * * *